United States Patent
Tomar et al.

(10) Patent No.: US 8,447,004 B2
(45) Date of Patent: May 21, 2013

(54) ESTIMATION AND COMPENSATION OF CLOCK VARIATION IN RECEIVED SIGNAL

(75) Inventors: Rohit Tomar, New Delhi (IN); Prashant Bhargava, Gurgaon (IN)

(73) Assignee: Freescale Semiconductor, Inc., Austin, TX (US)

( * ) Notice: Subject to any disclaimer, the term of this patent is extended or adjusted under 35 U.S.C. 154(b) by 350 days.

(21) Appl. No.: 13/020,815

(22) Filed: Feb. 4, 2011

(65) Prior Publication Data

US 2012/0195400 A1    Aug. 2, 2012

(30) Foreign Application Priority Data

Jan. 27, 2011    (IN) .............................. 192/DEL/2011

(51) Int. Cl.
*H04L 7/00*    (2006.01)

(52) U.S. Cl.
USPC ........................................................ 375/354

(58) Field of Classification Search
USPC .................. 375/354–355, 362; 370/503, 509, 370/516
See application file for complete search history.

(56) References Cited

U.S. PATENT DOCUMENTS

| 4,841,551 A | 6/1989 | Avaneas |
| 6,259,677 B1 | 7/2001 | Jain |
| 6,895,062 B1 * | 5/2005 | Wilson .......................... 375/355 |
| 7,761,251 B2 | 7/2010 | Bauerle |
| 2009/0220028 A1 * | 9/2009 | Warren .......................... 375/316 |
| 2011/0176589 A1 * | 7/2011 | Kolof et al. ................... 375/224 |

OTHER PUBLICATIONS

Blum, Philipp and Thiele, Lothar, Clock Synchronization using Packet Streams, 16th International Symposium on Distributed Computing, Toulose, FR, Oct. 28-30, 2002.
Aweya, Montono, Ouelette and Felske, Clock Synchronization using a Linear Process Model, International Journal of Network Management, vol. 16, Issue 1, Jan. 2002.

* cited by examiner

*Primary Examiner* — Khanh C Tran
(74) *Attorney, Agent, or Firm* — Charles Bergere (57) ABSTRACT

A method and system for estimating and compensating for variation between a receiver clock and a transmitter clock, where a receiver utilizes a high frequency clock signal to generate a receiver clock and then adjusts the receiver clock to compensate for variations between the receiver and transmitter clocks. The adjusted receiver clock is used to sample nibble pulses in a received data frame. Counter based compensation of the receiver clock eliminates the need for the receiver to perform floating point calculations, improves the accuracy of nibble pulse sampling and also reduces area and power consumption of the device.

20 Claims, 8 Drawing Sheets

FIG. 8

ESTIMATION AND COMPENSATION OF CLOCK VARIATION IN RECEIVED SIGNAL

BACKGROUND OF THE INVENTION

The present invention relates to a receiver clock system, and more particularly, to a method and system for estimating and compensating for variations between a transmitter clock and a receiver clock to facilitate error free sampling of nibble pulses in a received data frame.

With the advent of communication technologies, there have been rapid developments in communication systems and communication hardware. In various electronic communication systems, the data transferred from a sensor to an engine control unit (ECU) with serial data frames, where each data frame comprises bits that may be decoded to obtain the serial data. A method of data transmission in such systems follows a communication protocol defined by the Single Edge Nibble Transmission (SENT) specification. In accordance with the SENT specification, each data frame comprises a calibration pulse (also referred to as a sync pulse or synchronization pulse), a status and communication pulse, one to six nibble pulses, a cyclic redundancy check (CRC) nibble pulse and an optional pause pulse.

The data frame received at the ECU receiver is detected using a receiver clock. The receiver clock must be adjusted to compensate for variation present in the sensor or transmitting device clock. The calibration pulse is used to compensate for any such variations. The compensated or adjusted receiver clock is then used to accurately measure the received nibble pulses in the data frame. Additionally, the measured nibble pulses may be required to make adjustments in the measured nibble pulse length in order to compensate for variations due to clock compensation, synchronization, drift and jitter.

The generation of an accurate receiver clock requires estimation and adjustment of frequency variations in the transmitter or sensor clock and adjustment for other errors. In traditional receiver systems, these processes require floating point calculations, which lead to excessive consumption of area and power. The floating point calculations also require high precision and any error that is introduced during the calculation leads to incorrect sampling of received nibble pulses. The floating point calculation also puts a restriction on maximum operating frequency. The implementation becomes even more complex with an increase in the number of receiver channels.

It would be advantageous to have a receiver system that can compensate and adjust transmitter clock variations in an efficient manner without using floating point calculations. It also would be advantageous to have a receiver system that uses less area and consumes less power. The receiver system also should measure the received data with high accuracy and not limit maximum operating frequency.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method and system for estimating and compensating a receiver clock for variation between the receiver clock and a transmitter clock is provided. A receiver receives a data frame that includes a calibration pulse and a plurality of nibble pulses. The receiver further receives a high frequency (HF) clock signal and generates a receiver clock using a predetermined prescaler value and a counter that counts the HF clock signal cycles. For example, the count of HF clock pulses that is equal in number to the predetermined prescaler value will make one pulse of the receiver clock. The receiver includes a comparator for generating a rollover signal when the count of HF clock signal cycles reaches a predetermined prescaler value. A calibration pulse length in the received data frame is measured in terms of a count of the rollover signals and the HF clock signal cycles. The measured calibration pulse length is compared with an ideal calibration pulse length by a prescaler correction factor unit to determine a variation between the transmitter and receiver clocks. The determined variation is compensated for by an adjusted receiver clock generation unit that generates an adjusted receiver clock.

In another embodiment of the present invention, a method and system for sampling a plurality of nibble pulses in a received data frame is provided. The method includes the steps of measuring nibble pulse length in terms of a number of adjusted receiver clock cycles and HF clock signal cycles and adjusting the nibble pulse length in accordance with a predetermined criterion. The nibble pulse length is adjusted by adding one adjusted receiver clock cycle to the measured nibble pulse length if the number of HF clock signal cycles for a portion of the nibble pulse length not measured by the adjusted receiver clock lies within an allowable range. In accordance with an embodiment of the invention, the above steps for sampling the plurality of nibble pulses are performed using a nibble pulse sampling unit.

The method and the system described above have a number of advantages. The receiver uses an HF clock signal for generation and compensation of the receiver clock. The frequency of the HF clock signal can be adjusted to attain a desirable value to improve the accuracy of the system. Further, the receiver utilizes a counter based clock adjustment technique that eliminates any need for floating point calculations that may lead to inaccuracies that cannot be compensated. Also, as floating point calculation can be heavy on die area and power consumption, the present invention facilitates accurate nibble pulse sampling with relatively less area and power consumption. The receiver may be used with communication channels that comply with the SENT specification for data transfer and eliminates the overhead of processing SENT messages in software, as was conventionally done.

In accordance with the present invention, a receiver for measuring and compensating for variations in the transmitter or sensor clock is provided. Communication between the transmitter and receiver involves transmission of data frames over a communication channel. A data frame may be transmitted in accordance with various protocols that are further defined by certain specifications, such as the aforementioned SENT specification. The present invention is described below with respect to the SENT specification. However, the invention should not be construed as limited to a system or method that complies with the SENT specification. A person skilled in the art will appreciate that the invention also can be practiced with other communication standards/specifications.

Figure 1:
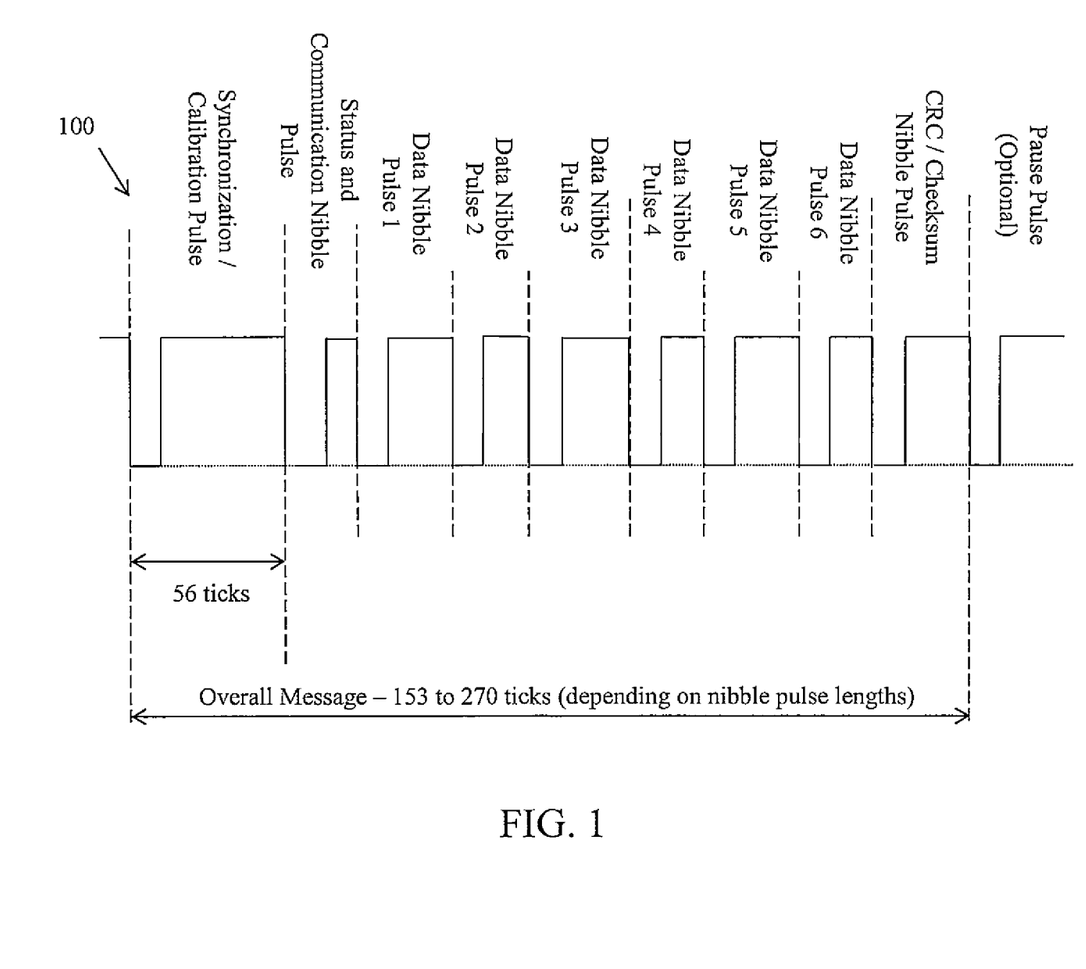
FIG. 1 is a timing diagram illustrating a data frame as defined by the SENT specification.

Referring now to FIG. 1, a timing diagram illustrating a data frame 100 defined by the SENT specification is shown. The data frame 100 comprises a calibration pulse, a status and communication nibble pulse, one or more (up to six) nibble pulses, a CRC nibble pulse and a pause pulse, which is optional. The pulse width of the calibration pulse is equal to 56 transmitter clock cycles. The pulse width of the one or more nibbles is variable and represents the nibble value carried by the data frame 100. In accordance with an embodiment of the invention, the signal transmitted over the communication channel comprises one or more data frames 100. The calibration pulse is used to synchronize the receiver clock and adjust the receiver clock to account for any variations in the transmitter clock. The adjusted receiver clock is then used for sampling nibble pulses.

Figure 2:
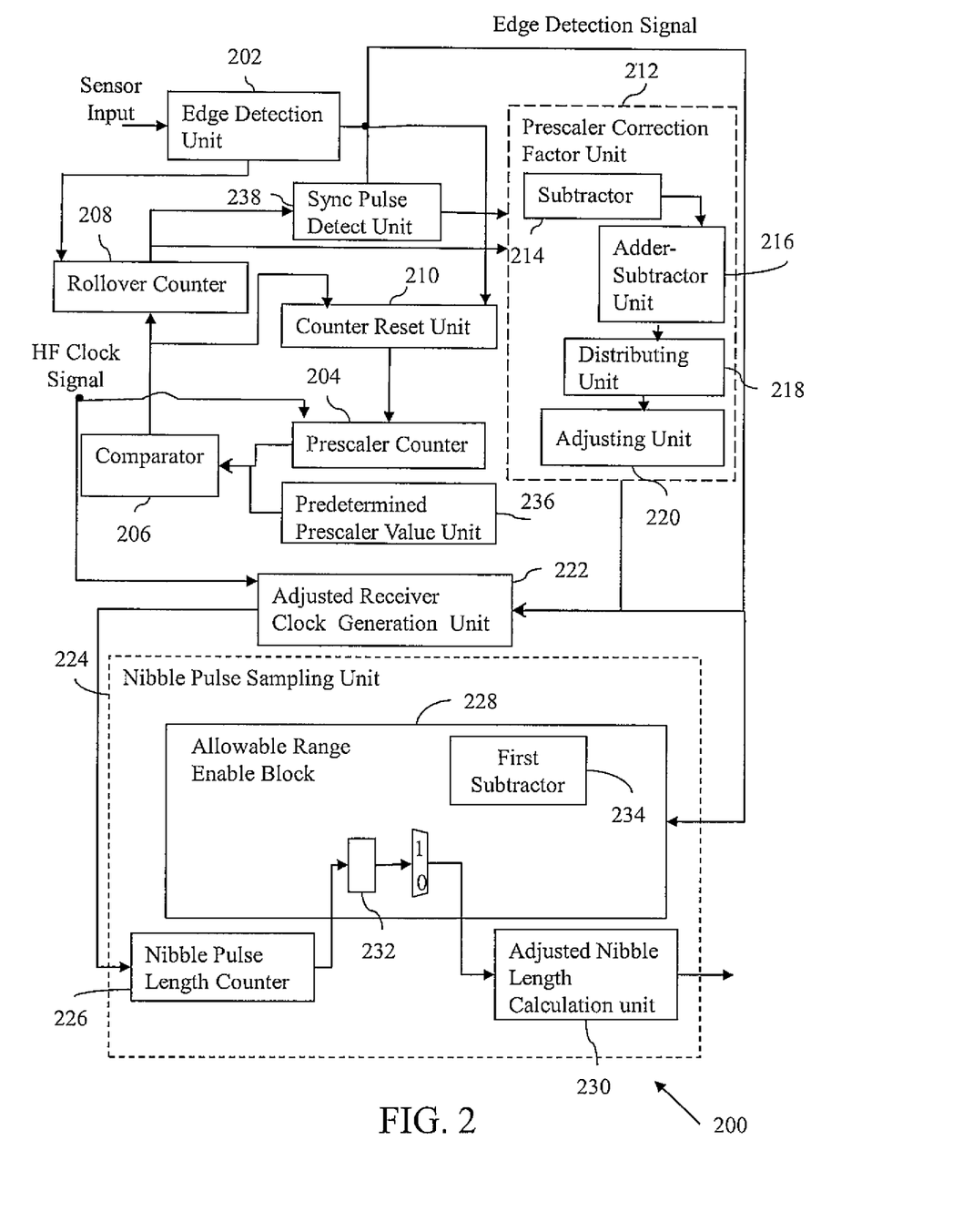
FIG. 2 is a schematic block diagram of a receiver system for adjusting the receiver clock and for sampling the received nibble pulses in accordance with an embodiment of the present invention.

FIG. 2 is a block diagram of a receiver 200 for adjusting the receiver clock and sampling the nibble pulses using the adjusted received clock. The receiver 200 comprises an edge detection unit 202, a prescaler counter 204, a comparator 206, a rollover counter 208, a counter reset unit 210, a prescaler correction factor unit 212, a predetermined prescaler value unit 236, a sync pulse detect unit 238 and an adjusted receiver clock generation unit 222. The prescaler correction factor unit 212 comprises a subtractor 214, an adder-subtractor unit 216, a distributing unit 218 and an adjusting unit 220.

In accordance with an embodiment of the invention, the receiver 200 also comprises a nibble pulse sampling unit 224 for sampling the nibbles in the received data frame. The nibble pulse sampling unit 224 comprises a nibble pulse length counter 226, an allowable range enable block 228, and an adjusted nibble pulse length calculation unit 230. The allowable range enable block 228 further comprises an addition unit 232 and a first subtractor 234.

In accordance with an embodiment of the invention, the receiver clock is generated using a high frequency (HF) clock signal and a predetermined prescaler value stored in the predetermined prescaler value unit 236. The predetermined prescaler value stored in the predetermined prescaler value unit 236 is preprogrammed so that the receiver clock to emulate the ideal transmitter clock frequency. The HF clock signal is received by the prescaler counter 204 which counts the number of HF clock signal cycles. The prescaler counter 204 and the predetermined prescaler value unit 236 are connected to the comparator 206 which is further connected to the rollover counter 208. When the count of HF clock signal cycles counted by the prescaler counter 204 equals the value in the predetermined prescaler value unit 236, the comparator 206 generates a rollover signal pulse. The prescaler counter 204 is then reset and starts counting the HF clock cycles again. The rollover signal represents the receiver clock, which is equal to the ideal transmitter frequency. For example, consider that the ideal transmitter frequency is 3 μs and the frequency of the HF clock signal is 195 μs. In such a scenario, the predetermined prescaler value is 65. As a result, the comparator 206 generates a rollover signal pulse whenever the counter 204 counts 65 HF clocks cycles.

The edge detection unit 202 receives the data frames transmitted over the communication channel and generates an edge detection signal. In an embodiment of the invention, the data frame that is received is the data frame as shown in FIG. 1. The edge detection unit 202 detects the negative edge in a received sensor input on every transition of high to low of the sensor input signal and sends the edge detection signal of 1 HF clock cycle to the sync pulse detect unit 238, the counter reset unit 210 and the nibble pulse sampling unit 224. The edge detection signal is used to reset the prescaler counter 204. The prescaler counter 204 then starts counting the HF clock cycles until the next negative edge of the input signal is encountered, at which time the edge detection signal is asserted. The rollover counter 208 counts the number of rollover cycles generated by the comparator 206 until it is reset by the edge detection signal and then starts counting again from zero. The value of rollover counter 208 is continuously monitored by the sync pulse detect unit 238 to determine the occurrence of calibration pulse by checking if the value lies with the valid calibration pulse length range. The sync pulse detect unit 238 generates a sync pulse detect signal of 1 HF clock cycle if the check passes. For instance, a calibration pulse is detected if the count of the rollover counter lies in the range of 42 to 70 receiver clock cycles (i.e., +/−25% error allowed on the ideal calibration pulse width, which is 56 receiver clock cycles in accordance with the SENT specifications).

On detection of the calibration pulse, the prescaler correction factor unit 212 is activated. The prescaler correction factor unit 212 adjusts the prescaler value to compensate the receiver clock for the variation in transmitter and sensor clocks. On activation, the prescaler correction factor unit 212 stores the count of rollover signal cycles in the calibration pulse from the rollover counter 208 and value of prescaler counter 204 for the portion of the calibration pulse not measured by the rollover pulses. The subtractor 214 compares the measured calibration pulse length (in terms of count of rollover signal cycles) with an ideal calibration pulse length to determine the variation. The ideal calibration pulse length is defined by the system specification. For example, the calibration pulse length is 56 clocks for compliance with the SENT specification. The variation is then used to determine an adjusted prescaler value. For example, assume that the rollover counter 208 has counted 60 receiver clock cycles as compared to the ideal count of 56 clock cycles in the calibration pulse. The subtractor 214 determines the variation as 4 receiver clock cycles. This implies that the prescaler value needs to be adjusted so that the adjusted receiver clock does not count four extra clock cycles. Further details for determining the adjusted prescaler value are described in greater detail in conjunction with FIG. 3. The adjusted prescaler value is henceforth sent to the adjusted receiver clock generation unit 222 to generate an adjusted receiver clock signal.

The adjusted receiver clock signal generated above takes into account and eliminates a major part of the variations due to transmitter and sensor clock frequencies by aligning the calibration pulse to the ideal pulse length when measured using the adjusted receiver clock. It is hence expected that the subsequent nibble pulses in the data frame, including the CRC, status and communication and the nibble pulses will be sampled with accuracy. However, the edges of the subsequent nibbles may still not be aligned with the receiver clock resulting in negative edges of the nibbles occurring slightly before or after the edge of the adjusted receiver clock cycle. This is caused primarily due to one or more of clock drift, jitter, residual error not corrected in clock compensation, error in the predetermined prescaler value when it is not an integer, and error due to synchronization of input filter. Thus there is a further requirement for compensation of the above errors for correct sampling of the nibble pulses.

In accordance with FIG. 2, the nibble pulse sampling unit 224 comprises a nibble pulse length counter 226 for counting the length of one or more nibble pulses in the data frame using the adjusted receiver clock. The count determined by the nibble pulse length counter 226 is corrected by the allowable range enable block 228, wherein the allowable range enable block 228 increases the nibble pulse length size by 1 to determine an adjusted nibble pulse length if the negative edge indicating the end of the nibble pulse lies within an allowable range of the adjusted receiver clock period. The allowable range determines the acceptable variation due to errors mentioned in above paragraph in accordance with specification requirement. In accordance with an embodiment of the invention, the adjusted nibble pulse length is further corrected by the adjusted nibble pulse length correction unit 230 in accordance with the specification requirement. In one embodiment of the invention, the adjusted nibble pulse length calculation unit 230 decreases the adjusted nibble pulse length by twelve (12) after allowable range correction in accordance with the SENT specification to determine the actual nibble value (in 4-bits). The implementation details for determining the adjusted nibble pulse length are described in greater detail in conjunction with FIG. 5.

Figure 3:
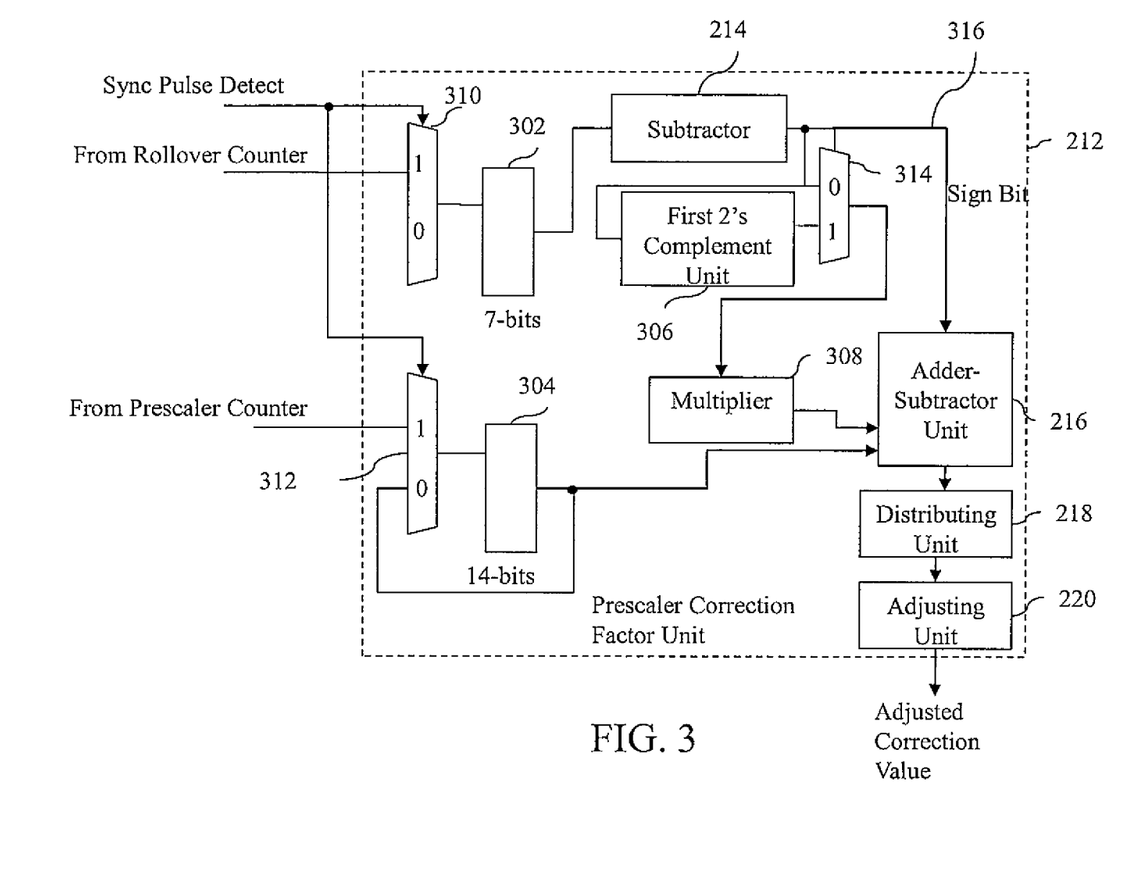
FIG. 3 is a detailed block diagram of a prescaler correction factor unit of the receiver system of FIG. 2 in accordance with an embodiment of the invention.

FIG. 3 is a detailed block diagram of the prescaler correction factor unit 212. The prescaler correction factor unit 212 comprises a 7-bit flip flop 302, a 14-bit flip flop 304, a subtractor 214, a first two's complement block 306, a multiplier 308, an adder-subtractor unit 216, a distributing unit 218, an adjusting unit 220, a plurality of multiplexers 310, 312 and 314 and a sign bit 316. On detection of the sync pulse detect signal, the prescaler correction factor unit 212 is activated and the 7-bit flip flop 302 receives the count from the rollover counter 208 through the multiplexer 310. The above count is then compared to the ideal calibration pulse length and a variation is determined using the subtractor 214, the first two complement unit 306 and the multiplexer 314. In accordance with the SENT specification, the ideal calibration pulse length is 56 transmitter clock cycles. Further, the portion of calibration pulse length not counted in the count of rollover counter 208, counted in terms of HF cycles, is received from the prescaler counter 204. This count is received by the 14-bit flip flop 304 through the multiplexer 312 upon activation of this unit 212. The total measured length of the calibration pulse at the receiver end can be represented by the following mathematical formula, > Measured calibration pulse length=the count of rollover signal pulses counted by the rollover counter 208 and the count of HF clock pulses that represent the portion of the calibration length not counted by the rollover pulses. This length is expressed as a number of HF clock cycles.

Consider for example, that the negative edge representing the end of the calibration pulse is detected by the edge detection unit 202 at an instance when the rollover counter has counted 60 rollover pulses and the prescaler counter has reached 54 HF clock pulses. In such a case, the calibration pulse length as given in the formula above will be:

> Measured calibration pulse length is 60 rollover pulses and 54 HF clock cycles.

In accordance with an embodiment of the invention, the subtractor 214 computes the first variation by subtracting the count of rollover signal pulses from the ideal calibration pulse length (56) and storing the sign bit (most significant bit) 316 for further calculations. The difference is converted in terms of HF clock cycles by first taking the two's complement of the difference if the sign bit 316 was set and then multiplying by the predetermined prescaler value. Using the above given example again, the first variation computed by the subtractor 214 is four (4) rollover pulses. Since the output is +ve (sign bit 316 not set), no two's complement is taken. The first variation is then represented in the terms of the HF clock pulses by the multiplier 308 by multiplying the difference with the predetermined prescaler value of the predetermined prescaler value unit 236. Considering the earlier given example that the predetermined prescaler value is 65, the multiplier represents the first variation of four (4) rollover pulses as 260 HF pulses. Further, the adder-subtractor unit 216 generates a second variation by adding or subtracting the count of HF clock signal cycles of the prescaler counter 204 to the value obtained from the multiplier 308, as per the value of the sign bit 316 output from subtractor 214. It is to be noted that the second variation is generated by subtracting the count of HF clock signal cycles from the result obtained at the output of the multiplier 308 if the count of the rollover counter 208 is less than the ideal calibration pulse length (56) or by addition if the count of the rollover counter 208 is greater than the ideal calibration pulse length. This can be mathematically represented as:

> First Variation={(56−count of the rollover counter 208)}*Predetermined Prescaler Value;

and

> Second Variation={(56−count of the rollover counter 208)}*Predetermined Prescaler Value+/−Count of the prescaler counter 204;

where,

> If count of the rollover counter 208>=56, then second Variation=(count of the rollover counter 208−56) *Predetermined Prescaler Value+Count of Prescaler Counter; (Eqn. 1)

And,

> If count of the rollover counter 208<56, then second variation=(56−count of rollover counter 208) *Predetermined Prescaler Value−Count of prescaler counter 204; (Eqn. 2)

The first variation (56–count of rollover counter 208) is computed by the subtractor 214 and the sign bit may be checked by the adder-subtractor unit 216 to identify whether addition or subtraction is to be performed and accordingly two's complement of the output of subtractor 214 is computed by the first two's complement unit 306, which forms the second operand for the adder-subtractor unit 216.

Continuing with the same example, the output of the adder-subtractor unit 216 is 314 HF clock pulses when the error in the calibration pulse measurement is four (4) rollover pulses (260 HF cycles) plus 54 HF pulses.

The second variation computed above (by the adder-subtractor unit 216) is then distributed over the ideal calibration pulse length (56 receiver clock pulses) by the distributing unit 218 to determine the error in each receiver clock cycle in terms of HF clock signal cycles. Thus, the second variation is used to adjust the receiver clock frequency so that the receiver clock frequency is closer to the actual transmitter clock frequency, which allows for correct sampling of subsequent nibbles. The distribution can be mathematically represented as:

Error per receiver clock cycle=Second Variation/56.

The error per receiver clock cycle becomes 314/56, as per the example. The error thus becomes $5^{34}/_{56}$ (i.e. 5.607)) HF clock pulses. Since the receiver clock is generated using the HF clock signal and the prescaler value, the determined error is used to calculate the value by which the predetermined prescaler value needs to be adjusted to compensate for this error. The time period of the receiver clock is adjusted as:

Required time period of adjusted receiver clock=Time Period of HF clock*(Predetermined Prescaler Value+/–Error in each receiver clock cycle).

However, the adjusted receiver clock cycle time period calculated above needs further adjustment due to a couple of factors. First, the error as defined in the above mathematical expression will be in form of Q+R, where Q is the quotient received after division, and R is the remainder. Considering the example, 5 HF clock pulses is the quotient and 34 HF clock pulses are the remainder. Since the remainder is not considered for adjustment and in order to avoid floating point calculations, its effect introduces less than one HF clock cycle error in the receiver clock cycle. In the case where the receiver clock frequency is greater than the transmitter clock frequency (rollover count is greater than 56), the error needs to be added to the predetermined prescaler value. In this case, leaving the remainder reduces the time-period of the resulting or adjusted receiver clock up to one HF clock cycle. In addition, for an extra margin of safety, one additional HF clock cycle is subtracted from the error for unaccounted errors that occur due to synchronization or quantization. Thus, two HF clocks are reduced.

Figure 6A:
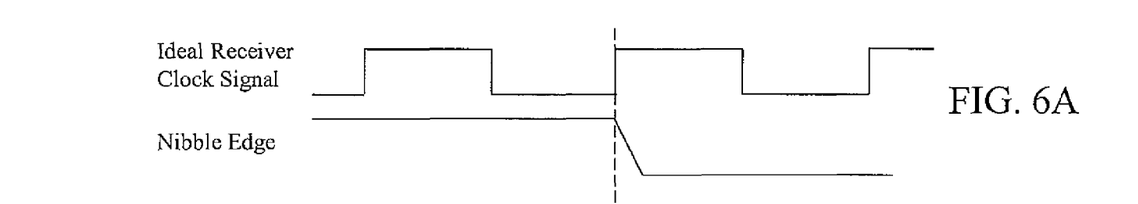
FIG. 6A is a timing diagram illustrating detection of a nibble edge with a receiver clock signal in an ideal scenario with no variation.

However, in the case where the transmitter clock frequency is greater than the receiver clock frequency (count of rollover counter<56), the remainder error needs to be subtracted (refer Eqn. 2) from the predetermined prescaler value. Leaving out the remainder from the subtraction results in the time period of the adjusted receiver clock to be up to one HF clock cycle higher than the transmitter clock. On sampling the nibbles using this adjusted receiver clock, the accumulated error over multiple clock cycles will result in missing the negative edge of the last pulse representing the end nibble, resulting in erroneous sampling of the nibble (similar to as shown in FIG. 6C). To avoid this, one HF clock cycle is subtracted from the predetermined prescaler value. In addition, one more HF clock cycle is subtracted from the predetermined error for unaccounted errors that occur due to synchronization or quantization.

Figure 6B:
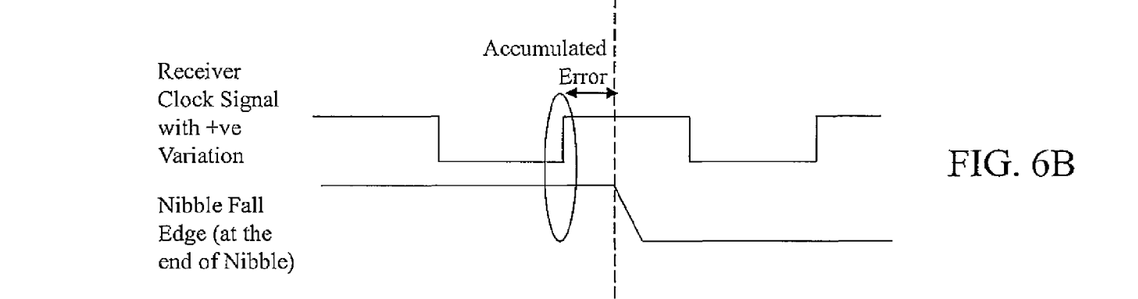
FIG. 6B is a timing diagram illustrating detection of a nibble edge with a receiver clock signal with a positive variation in the transmitter/sensor clock.
Figure 6C:
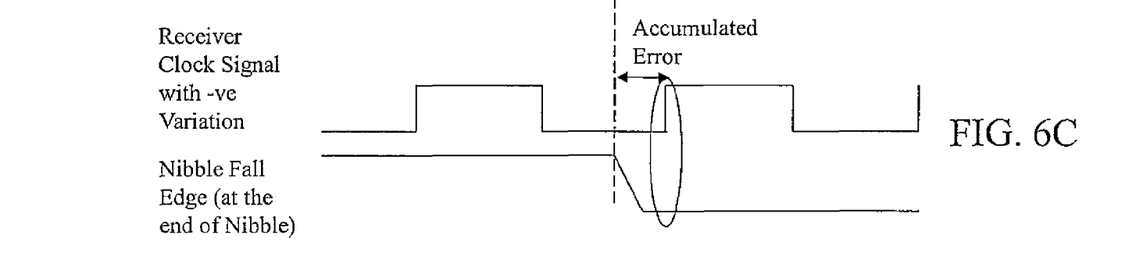
FIG. 6C is a timing diagram illustrating detection of a nibble edge with a receiver clock signal with a negative variation in the transmitter/sensor clock.

Removal of two (2) receiver clock cycles in either case will have the effect of moving the nibble fall edge at the end of nibble pulse beyond the receiver clock edge that will sample it (See FIG. 6B). However, this will not affect sampling of nibble pulses provided the frequency of HF clock is kept above a minimum value as explained further in the document. This will be true even if the remainder was zero (0).

The adjustment for the two clocks mentioned above is carried out by the adjusting unit 220, connected to the distribution unit 218. The adjusted correction value after adjustment of these errors is represented as:

If Count of Rollover Counter>=56, then Adjusted Correction Value=((Count of Rollover Counter–56) *Predetermined Prescaler Value+Count of Prescaler Counter)/56–1; (Eqn. 3)

and

If Count of Rollover Counter<56, then Adjusted Correction Value=((56–Count of Rollover Counter) *Predetermined Prescaler Value–Count of Prescaler Counter)/56–2; (Eqn. 4)

The adjusted correction value obtained above is a signed value and is added to the predetermined prescaler value to generate an adjusted prescaler value which is then used to generate an adjusted receiver clock by the adjusted receiver clock generation unit 222.

Figure 4:
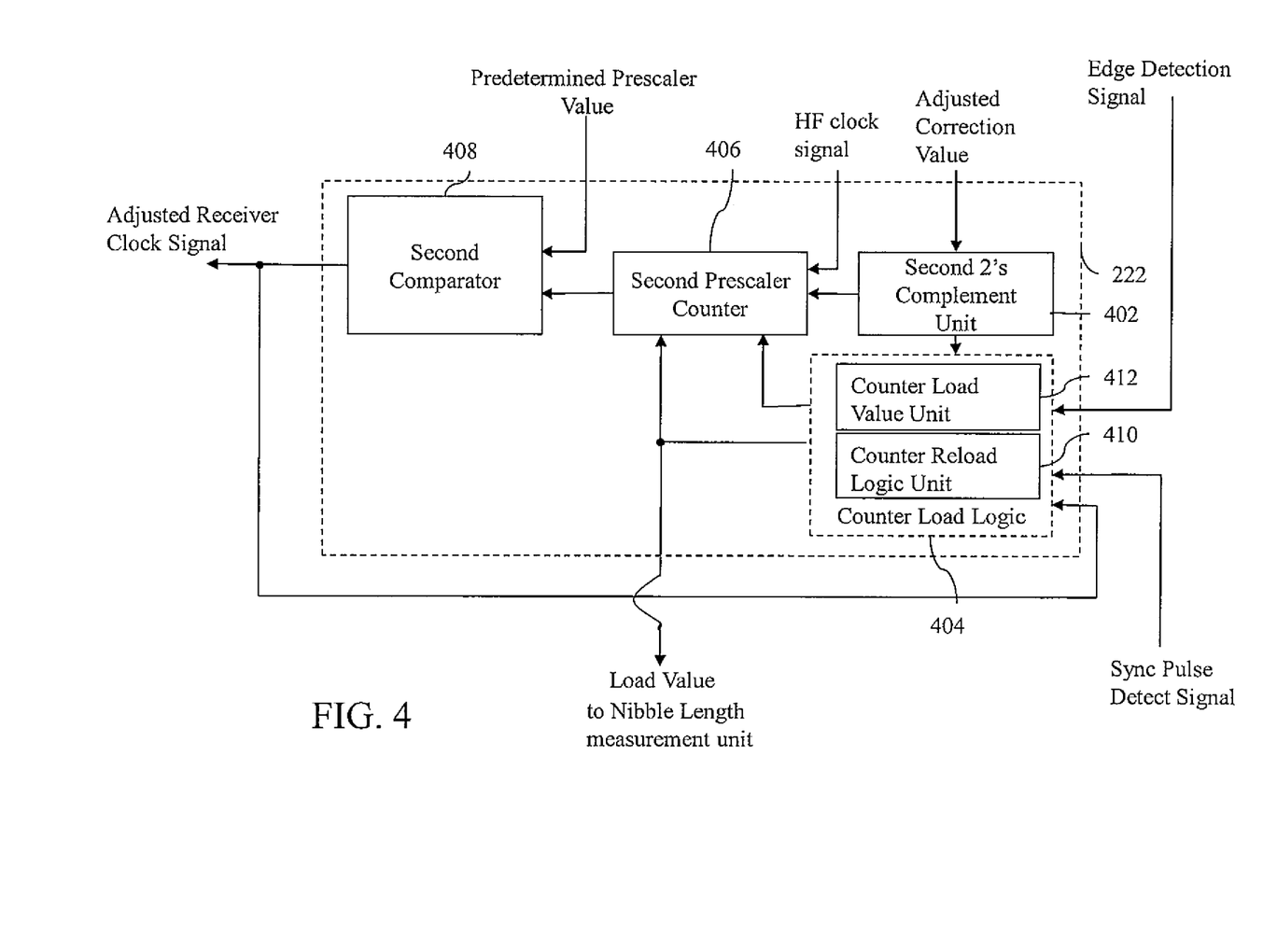
FIG. 4 is a detailed block diagram of an adjusted receiver clock generation unit of the receiver system of FIG. 2 in accordance with an embodiment of the invention.

FIG. 4 is a detailed block diagram of the adjusted receiver clock generation unit 222. The adjusted receiver clock generation unit 222 comprises a second two's complement unit 402, a counter load logic unit 404, a second prescaler counter 406 and a second comparator 408. The counter load logic unit 404 further comprises a counter reload logic unit 410 and a counter load value unit 412.

The second two's complement unit 402 generates the two's complement of the adjusted correction value (computed in Eqns. 3 & 4) based on the sign bit generated by the prescaler correction factor unit 212 and sends it to the load value unit 412 of the counter load logic unit 404. The two's complement is computed when count of rollover counter 208>56. Further, the counter load logic unit 404 receives inputs from the edge detection unit 202, the sync pulse detect unit 238 and the second comparator 408. On detection of at least one of the inputs mentioned above, the counter reload logic unit 410 sends a reset signal to the second prescaler counter 406, thereby resetting the second prescaler counter 406. Further, the load value unit 412 receives the two's complement of the adjusted correction value and generates a load value for the second prescaler counter 406, wherein the load value is determined as follows:

If one HF clock delayed sync pulse detect signal=1, then Load value=(two's complement of the adjusted correction value)+2;

If edge detection signal=1, then Load value=(two's complement of the adjusted correction value)+1; and If adjusted receiver clock signal=1, then Load value= (two's complement of the adjusted correction value);

The two's complement is computed when the count of the rollover counter 208>56 (as indicated by the sign bit).

In accordance with an embodiment of the invention, the second prescaler counter 406 is a 15-bit counter, connected to the counter load logic unit 404, where one bit (or the most significant bit) of the second prescaler counter 406 is used to store the sign of the load value. A starting count value (or offset) of the second prescaler counter 406 is determined in accordance with the load value and the sign information of load value received from the counter load logic unit 404. For example, if the load value is 5 and the sign bit of the load value is a one (1) (−ve sign bit), the second prescaler counter 406 will have a starting value of (−5). The second prescaler counter 406 is further connected to the second comparator 408, which generates an adjusted receiver clock pulse when the HF clock count of the second prescaler counter 406 is equal to the predetermined prescaler value of the predetermined prescaler value unit 236. A person skilled in the art will appreciate that the offset of the second prescaler counter 406 helps in implementing an adjusted prescaler value. In other words, the result of this implementation is the same as considering that the predetermined prescaler value has been increased/decreased by the load value (which is 5 in the present example).

Figure 5:
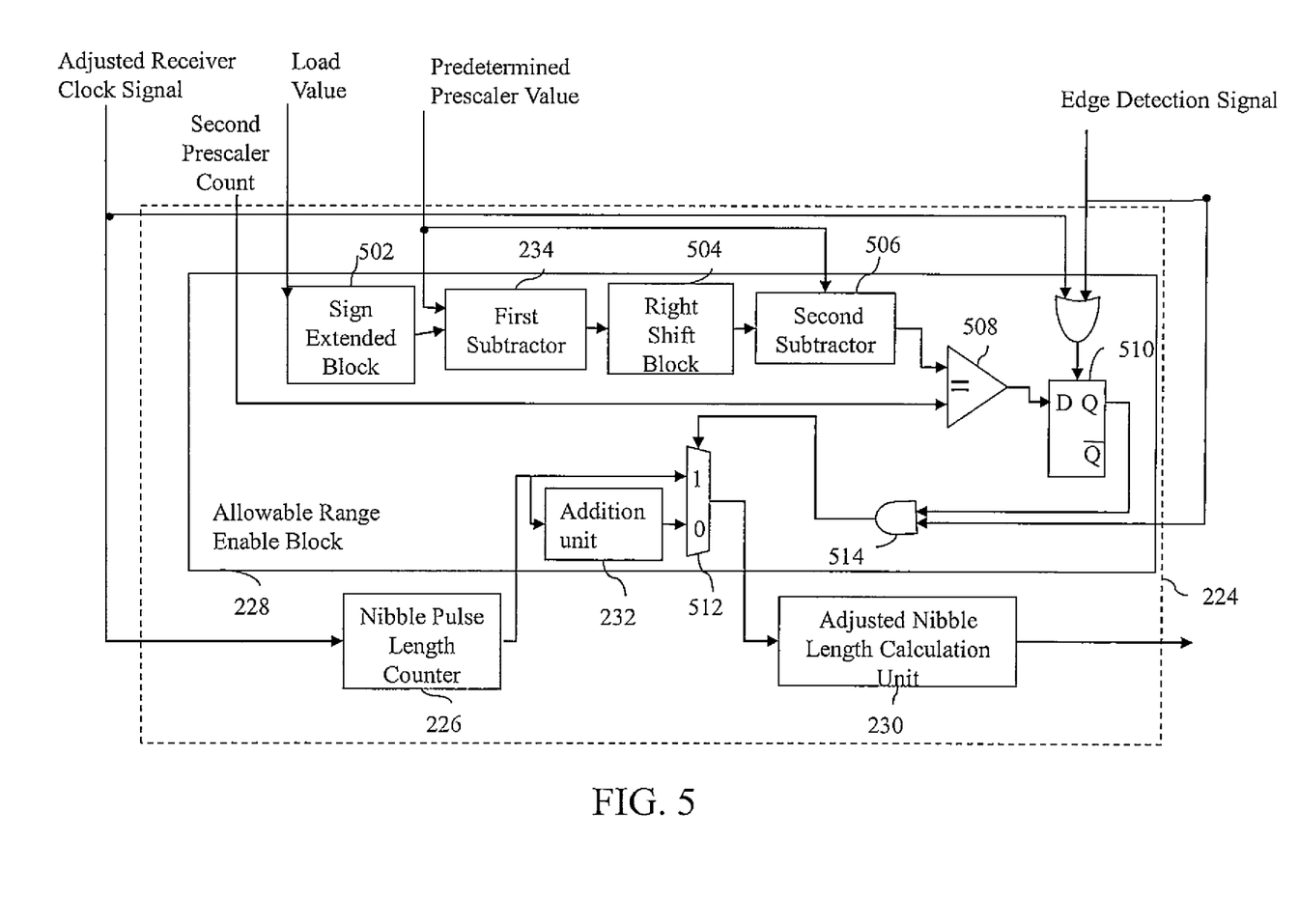
FIG. 5 is a detailed block diagram of a nibble pulse sampling unit of the receiver system of FIG. 2 in accordance with an embodiment of the invention.

FIG. 5 is a detailed block diagram of the nibble pulse sampling unit 224. The nibble pulse sampling unit 224 comprises a nibble pulse length counter 226, an allowable range enable block 228 and an adjusted nibble pulse length calculation unit 230. The allowable range enable block 228 further comprises a sign extended block 502, the first subtractor 234, a right shift block 504, a second subtractor 506, a third comparator 508, an addition unit 232, an AND gate 514 and a flip flop 510 and multiplexer 512.

In accordance with an embodiment of the present invention, the nibble pulse length counter 226 counts a nibble pulse length of a received nibble pulse in the data frame of FIG. 1. As discussed earlier, the nibble pulse length counted in the above step, however, has error that may be due to receiver and transmitter clock drift and jitter, receiver clock compensation, synchronization of input filter and error in the predetermined prescaler value (fractional part is ignored). In accordance with an embodiment, compensation for the above errors is carried out by the allowable range enable block 228. The allowable range enable block 228 increases the count of the nibble pulse length counter 226 by one adjusted receiver clock cycle if the error lies within an allowable range. The nibble pulse length compensated by the allowable range enable block 228 is further adjusted by the adjusted nibble pulse length calculation unit 230, where the adjustment may correspond to the communication standard used. In accordance with an embodiment of the invention, the adjusted nibble pulse length calculation unit 230 decreases the count of the nibble pulse length by twelve (12) adjusted receiver clock cycles as per the SENT specification, to obtain the final 4-bit nibble value at the receiver.

The error in the received nibble pulses, due to transmitter and receiver clock drift and jitter, and receiver clock compensation and synchronization and error in predetermined prescaler value is discussed in greater detail in this section. It should be apparent to a person skilled in art that the error due to clock drift and jitter is computed, in general, as a fraction of the clock period in order to compensate. In accordance with the SENT specification, the clock drift and jitter error in the worst case scenario for all ranges of receiver clock is 11.5% of the receiver or transmitter clock period. To add an extra margin of safety and for ease of implementation, the maximum error is considered to be 12.5% of the receiver or transmitter clock period, which is equal to ⅛ of the transmitter or receiver clock frequency. It should also be apparent to person skilled in the art that the error due to receiver clock compensation and synchronization is variable and depends on the frequency of the HF clock signal cycle. As discussed in the above paragraphs, the maximum error introduced due to compensation of receiver clock is 2 HF clock signal cycles per nibble pulse length (refer to Eqns. 1 and 2). Further, taking the consideration for any error in the predetermined prescaler value of the predetermined prescaler value unit 236 and other unforeseen errors, the maximum possible error in one adjusted receiver clock cycle is total 3 HF clock cycles. When this adjusted receiver clock is used to sample a nibble pulse, the error gets accumulated over the process of sampling the nibble pulse. This may result in early negative edge of the nibble pulse from the expected positive edge on the receiver clock pulse. Considering the worst case scenario, the maximum error accumulated over the nibble pulse length is for the longest nibble pulse. The longest possible nibble pulse length is of 27 pulses, according to the SENT specifications. Thus, the maximum accumulated error due to compensation becomes equal to 81 HF pulses (27*3). Further, the error due to synchronization mismatch between the edges of the nibble pulse and HF clock signal can cause a loss up to 2 HF clock signal cycles. The total error due the factors explained above can be mathematically represented as:

$$\text{Total Error} = (27*3+2)*\text{HF clock cycle period} +/- (⅛) * \text{transmitter clock period}.$$

The error defined above may result in an unaligned negative edge at the end of the nibble pulse with respect to the adjusted receiver clock cycle. This may be in form of an early negative edge or a late negative edge of the nibble pulse with respect to the adjusted receiver clock. This is explained in greater detail in accordance with FIGS. 6A-6C.

FIG. 6A is a timing diagram illustrating detection of a nibble fall edge (at end of nibble pulse) with an ideal receiver clock signal. As illustrated, the negative edge of the nibble is in-line with the positive edge of the receiver clock cycle. FIG. 6B is a timing diagram illustrating detection of a nibble fall edge (at end of nibble pulse) with a receiver clock signal with a positive variation. As illustrated in the FIG. 6B, the negative falling edge of the nibble (at end of nibble pulse) occurs beyond the positive edge of the receiver clock cycle (due to error). In this case, due to the total error defined above, the negative edge of the nibble pulse (at end of nibble pulse) lies beyond the positive edge of the receiver clock cycle that is expected to sample the nibble pulse. Since the current nibble pulse is still valid at the start of the next receiver clock cycle, the nibble is sampled correctly and no further adjustment is required. The nibble is sampled correctly until the accumulated error does not reach the next adjusted receiver clock pulse. This is ensured by appropriately choosing the HF clock frequency. This is explained later.

FIG. 6C is a timing diagram illustrating detection of a nibble fall edge (at end of nibble pulse) with a receiver clock signal with a negative variation. In this case, the negative edge of the nibble pulse (at end of nibble pulse) lies before the positive edge of the receiver clock cycle that is expected to sample it. This results in the nibble pulse not getting sampled as the receiver clock misses the negative edge of the nibble. This total error needs to be compensated for correct sampling of the nibble. In accordance with an embodiment, this compensation is performed by the allowable range enable block 228 using an allowable range.

The allowable range is determined based on the maximum value of the total error calculated above, and mathematically represented as:

$$\text{Total Maximum Error} = (27*3+2)*\text{HF clock signal period} + (⅛)*\text{transmitter clock period}. \quad \text{(Eqn. 5)}$$

The maximum error can be compensated for if the total error expressed above lies within one transmitter clock cycle, since beyond this, the nibble pulse will be incorrectly sampled by the next adjusted receiver clock cycle. To add the extra margin of security and for ease of implementation, the total error is considered and maintained to be ⅞ of the transmitter clock period or the adjusted receiver clock period. This can be mathematically represented as:

Total Maximum Error<(⅞)*transmitter clock period   (Eqn. 6)

Combining Eqns. 5 and 6:

(27*3+2)*HF clock signal period+(⅛)*transmitter clock period<(⅞)*transmitter clock period.

Simplifying this equation for HF clock, gives:

HF clock signal period<(3*transmitter clock period)/(83*4).

Thus, by appropriately choosing the HF signal frequency, the total error is maintained to be less than ⅞ of the transmitted clock period and nibble pulses can be sampled correctly.

Referring again to FIG. 5, the allowable range enable block 228 comprises a sign extended block 502 that receives the load value determined by the counter load logic block 404 of FIG. 4. The sign extended block 502 provides the sign extended offset, which is same as the offset of the second prescaler counter 406, to the first subtractor 234 but the sign bit is replicated to match the bit width of the subtractor. The adjusted prescaler value is determined by the by subtracting the offset to the predetermined prescaler value with the first subtractor 234. The right shift block 504 determines the ⅛ of the adjusted prescaler value, which is also the ⅛ of the adjusted receiver clock period. The above operation is accomplished by right shifting the adjusted prescaler value by 3 bits by the right shift block 504. Finally, the second subtractor 506 calculates the count of allowable range (⅞ of receiver clock cycle) by subtracting the ⅛ of the adjusted prescaler value determined by the right shift block 504 from the predetermined prescaler value. The result of this subtraction gives the starting count in terms of HF clock cycles where the ⅛ of adjusted receiver clock period or allowable region is to start. The third comparator 508 compares the count of the second prescaler counter 406 with the start count of allowable range calculated above. If the count of second prescaler counter matches, a flip flop 510 is asserted which indicates that the allow range of the adjusted receiver clock period has started. The flip flop 510 is de-asserted when either the second comparator 408 (FIG. 4) generates a rollover pulse (i.e. end of adjusted receiver clock period) or edge detect signal from the edge detection unit 202 (FIG. 2) is asserted. The output of the flip flop 510, along with the detection of negative edge of the nibble, activates the multiplexer 512 and the AND gate 514. The multiplexer 512 accordingly controls the process of adding or not adding a pulse to the nibble pulse length counter output, to adjust the nibble pulse length against the errors shown in Eqn. 3. In other words, if the negative edge of the nibble is encountered within the allowable range of the ⅛ of transmitter clock period, the count in nibble pulse length counter 226 in incremented by 1, to compensate for the total error as shown in Eqn. 3. In accordance with an embodiment of the invention, the adjusted nibble pulse length is further corrected by the adjusted nibble pulse length correction unit 230 as per the specification. In one embodiment of the invention, the adjusted nibble pulse length calculation unit 230 decreases the adjusted nibble pulse length by 12 in accordance with the SENT specifications, to get the final nibble value from the received frame.

Figure 7:
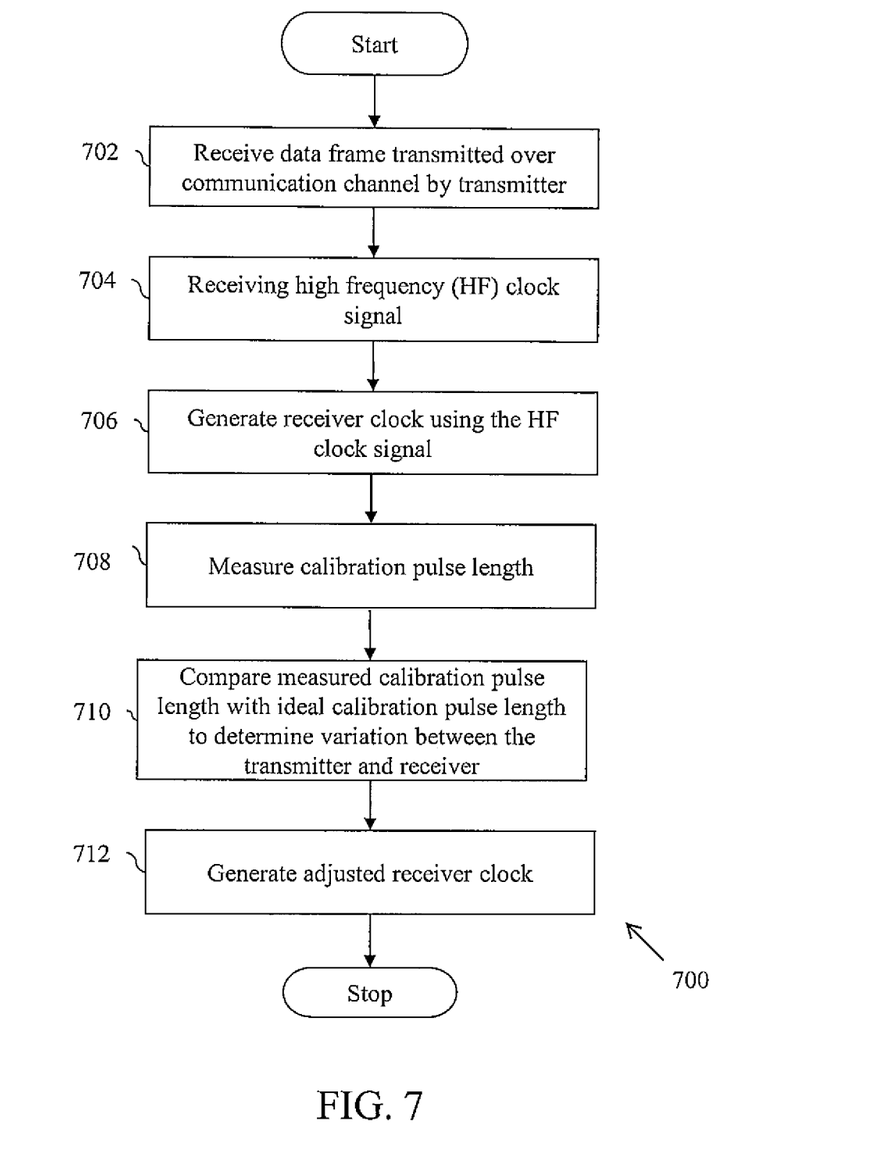
FIG. 7 is a flow chart illustrating a method for estimating and compensating for variation between a receiver clock and a transmitter clock in accordance with an embodiment of the present invention.

FIG. 7 is a flow chart illustrating a method for estimating and compensating for variation between a receiver clock and a transmitter clock in accordance with an embodiment of the present invention. The flowchart 700 has been described in conjunction with FIG. 2.

At the step 702, a data frame transmitted over a communication channel is received by the receiver 200 of FIG. 2. The data frame includes a calibration pulse, one or more nibble pulses and an optional pause pulse. At step 704, the receiver receives an HF clock signal at the prescaler counter 204 and the adjusted receiver clock generation unit 222 of FIG. 2. At subsequent step 706, the receiver 200 generates a receiver clock by using the HF clock signal and the predetermined prescaler value. This is done by counting a predetermined prescaler value of HF clock signal cycles by the prescaler counter 204. At step 708, the length of the calibration pulse is measured using the rollover counter 208 and the prescaler counter 204. On detection of the calibration pulse by the sync pulse detect unit 238, the prescaler correction factor unit 212 is activated to carry out the compensation of the receiver clock based on the calibration pulse measurements. The measured calibration pulse length is compared with an ideal calibration pulse length in the step 710. The comparison is executed in the prescaler correction factor unit 212 to determine the variation between the receiver and the transmitter clocks in accordance with the process as explained with reference to FIG. 3. The variation obtained at the step 710 is expressed in terms of number of HF clock signal cycles.

At step 712, an adjusted receiver clock is generated by the adjusted receiver clock generation unit 222 by compensating for the variation obtained at step 710 in accordance with the process as explained with respect to FIG. 4. The adjusted receiver clock is then utilized by the nibble pulse sampling unit 224 for accurate sampling of the nibble pulses in the receiver data frame.

Figure 8:
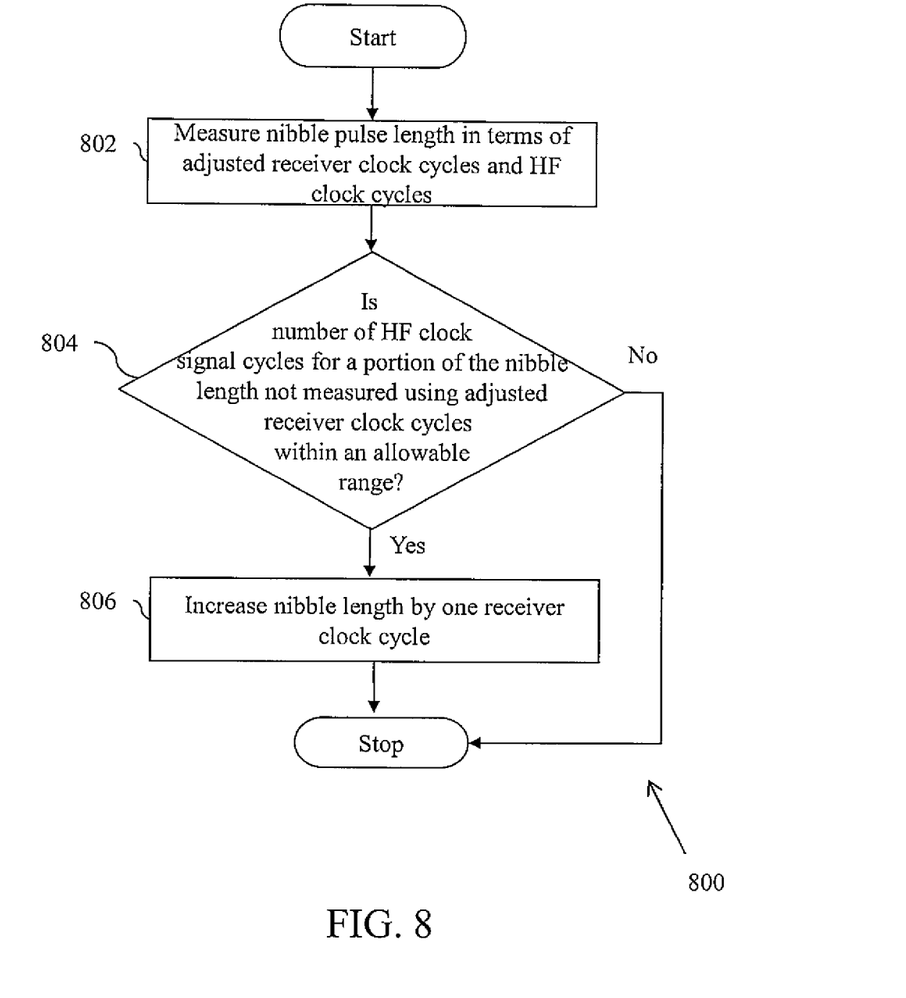
FIG. 8 is a flow chart illustrating a method for sampling one or more nibble pulses in accordance with an embodiment of the present invention.

FIG. 8 is a flow chart illustrating a method for sampling one or more nibble pulses in accordance with an embodiment of the present invention. The flow chart 800 is described in conjunction with FIG. 2.

At step 802, the length of a nibble pulse is measured by using the adjusted receiver clock obtained from the adjusted receiver clock generation unit 222 of FIG. 2. The nibble pulse length is measured in terms of adjusted receiver clock cycles. In step 804, it is checked if the number of HF clock signal cycles measuring the portion of nibble pulse length, which is not measured by the adjusted receiver clock cycles, lies within an allowable range. As already discussed in FIG. 5, the allowable range is ⅛ of the adjusted receiver clock cycle. Finally, in step 806, the nibble pulse length determined in the step 802 is increased by one if the criterion of step 804 is fulfilled; else no further adjustments are made to the nibble pulse length measurement. The resulting nibble pulse length is considered to be the length of the received nibble pulse.

In an alternate embodiment of the invention, the adjusted prescaler value determined at step 710 in FIG. 7, is further adjusted by removing a number of additional HF clock cycles. The number of additional HF clock cycles that are removed is equal to the allowable range, expressed in terms of HF clock cycles. The receiver clock generated using the further adjusted prescaler value is used for sampling nibble pulse. In this embodiment, the allowable range enable block 228 of FIG. 2 is not required for calculating and adjusting the nibble pulses corresponding to the allowed range.

In an alternate embodiment of the invention, the step 804 of FIG. 8 is eliminated. The nibble pulse sampling unit 224 measures the nibble length in the middle of every adjusted receiver clock cycle. This further requires that the adjusted rollover signal is generated when the value in the second prescaler counter 406 reaches half of the predetermined prescaler value. However, the reset of second prescaler counter 406 occurs only when the value becomes equal to the adjusted prescaler value. This eliminates the requirement of the allowable range enable block 228 as the nibble sampling is not affected by the occurrence of the negative edge (at the end of the nibble pulse) before or after the positive edge of the corresponding receiver clock cycle (as shown in FIG. 6).

The methods and the system described above have a number of advantages. The receiver utilizes an HF clock signal for generation and compensation of the receiver clock. The frequency of the HF clock signal can be adjusted to attain a desirable value to improve the accuracy and power consumption of the system. Also, the receiver uses a counter based clock adjustment technique that eliminates any need for floating point calculations that may lead to inaccuracies that might not be detectable and/or correctable; hence the present invention facilitates accurate nibble sampling. The receiver may be used with communication channels that comply with the SENT specifications for data transfer and also eliminates the overhead of processing SENT messages in software, as was conventionally done.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A method for estimating and compensating for variation between a receiver clock and a transmitter clock, comprising the steps of:
   receiving a data frame transmitted over a communication channel by a transmitter, the data frame including a calibration pulse and one or more nibble pulses;
   receiving a high frequency (HF) clock signal;
   generating a receiver clock using the HF clock signal by counting cycles of the HF clock signal, wherein a period of the receiver clock equals a predetermined prescaler value of the HF clock signal cycles;
   generating a rollover signal when the HF clock signal cycle count reaches the predetermined prescaler value;
   counting the rollover signals;
   measuring a length of the calibration pulse in terms of the rollover signal count and the HF clock signal cycle count;
   comparing the measured calibration pulse length with an ideal calibration pulse length to determine the variation between the transmitter and receiver clocks, wherein said variation is expressed as a number of HF clock signal cycles; and
   generating an adjusted receiver clock by compensating for said variation.

2. The method of claim 1, wherein compensating for said variation comprises:
   distributing said variation over the ideal calibration pulse length to determine a variation in the number of HF clock signal cycles per transmitter clock cycle in the ideal calibration pulse length; and
   generating an adjusted prescaler value from the predetermined prescaler value by,
      adding the determined variation in the number of HF clock signal cycles per transmitter clock cycle if the ideal calibration pulse length is greater than the measured calibration pulse length; and
      subtracting the determined variation in the number of HF clock signal cycles per transmitter clock cycle if the measured calibration pulse length is greater than the ideal calibration pulse length.

3. The method of claim 2, wherein generating the adjusted receiver clock comprises:
   subtracting one HF clock signal cycle from the adjusted prescaler value if the measured calibration pulse length is greater than the ideal calibration pulse length, and
   subtracting two HF clock signal cycles from the adjusted prescaler value if the ideal calibration pulse length is greater than the measured calibration pulse length.

4. The method of claim 1, wherein the ideal calibration pulse length is based on the transmitter clock.

5. The method of claim 1, further comprising sampling the one or more nibble pulses in the data frame being received using the adjusted receiver clock.

6. The method of claim 5, wherein sampling the one or more nibble pulses comprises:
   measuring a nibble pulse length in terms of a number of adjusted receiver clock cycles and HF clock cycles; and
   increasing the nibble pulse length by one receiver clock cycle if the number of HF clock signal cycles for a portion of the nibble pulse length not measured using the adjusted receiver clock cycles lies within an allowable range.

7. The method of claim 6, wherein the allowable range is based on drift and jitter in the transmitter and receiver clocks.

8. The method of claim 6, wherein a frequency of the HF clock signal is greater than a minimum predefined frequency based on a maximum permissible error in the measurement of the received nibble pulse length.

9. The method of claim 8, wherein the maximum permissible error is ⅞ of an adjusted receiver clock period.

10. The method of claim 6, wherein the allowable range is ⅛ of one adjusted receiver clock period.

11. The method of claim 1, wherein the ideal calibration pulse length comprises fifty-six (56) transmitter clock cycles.

12. A receiver for receiving a data frame transmitted over a communication channel by a transmitter, the data frame including a calibration pulse and one or more nibble pulses, the receiver comprising:
   an edge detection unit for detecting an edge of the calibration pulse and generating an edge detection signal;
   a prescaler counter that receives a high frequency (HF) clock signal and counts cycles of the HF clock signal;
   a comparator for generating a rollover signal when the HF clock signal cycle count reaches a predetermined prescaler value;
   a rollover counter for measuring a length of the calibration pulse in terms of a count of the rollover signals;
   a counter reset unit that generates a reset signal on assertion of at least one of the edge detection signal and the rollover signal, wherein the reset signal is used to reset the prescaler counter and the rollover counter;
   a prescaler correction factor unit for generating an adjusted prescaler value, the prescaler correction factor unit including:
      a subtractor that subtracts the measured calibration pulse length from an ideal calibration pulse length to generate a first variation, wherein the first variation is expressed as a number of HF clock cycles;
      an adder-subtractor unit that performs at least one of:
         adding a portion of the calibration pulse not measured by the rollover counter to the first variation to generate a second variation if the measured calibration pulse length is greater than the ideal calibration pulse length; and subtracting the portion of the calibration pulse not measured by the rollover counter from the first variation to generate the second variation if the ideal calibration pulse length is greater than the measured calibration pulse length, wherein the portion of the calibration pulse not measured by the rollover counter is received from the prescaler counter, and wherein the second variation represents the total variation over the calibration pulse length between the transmitter and receiver clocks in terms of HF clock signal cycles;

a distributing unit that distributes the second variation over the ideal calibration pulse length to determine the number of HF clock signal cycles of the second variation per transmitter clock cycle in the ideal calibration pulse length;

means for adjusting the predetermined prescaler value by the determined number of HF clock cycles of the second variation per transmitter clock cycle to obtain the adjusted prescaler value; and an adjusted receiver clock generation unit that generates an adjusted receiver clock signal.

13. The receiver of claim 12, wherein the adjusted receiver clock generation unit adjusts the receiver clock so that an adjusted receiver clock period is one HF clock cycle less than the adjusted prescaler value if the measured length of the calibration pulse is greater than the ideal calibration pulse length and two HF clock cycles less than the adjusted prescaler value if the ideal calibration pulse length is greater than the measured length of the calibration pulse.

14. The receiver of claim 12, further comprising a nibble pulse sampling unit that receives the data frame and samples the one or more nibble pulses using the adjusted receiver clock signal.

15. The receiver of claim 14, wherein the nibble pulse sampling unit comprises:

a nibble pulse length counter for counting a nibble pulse length in terms of a number of adjusted receiver clock cycles and generating a nibble pulse length count; and an allowable range enable block, connected to the nibble pulse length counter, for increasing the nibble pulse length count by one adjusted receiver clock cycle if the number of HF clock signal cycles for a portion of the nibble pulse length not measured by the adjusted receiver clock cycles lies within an allowable range.

16. The receiver of claim 15, wherein the allowable range comprises ⅛ of adjusted receiver clock period.

17. The receiver of claim 15, further comprising an adjusted nibble pulse length calculation unit connected to the nibble pulse length counter for adjusting the nibble pulse length in accordance with a predefined standard.

18. The receiver of claim 12, wherein the prescaler counter is a 14-bit counter.

19. The receiver of claim 12, wherein the adjusted receiver clock generation unit includes a 15-bit prescaler counter that includes a sign bit for counting a sign offset of the second variation.

20. In a receiver that has a receiver clock, a method for sampling nibble pulses using an adjusted receiver clock, wherein the nibble pulses are part of a data frame transmitted over a communication channel by a transmitter that operates using a transmitter clock, the method comprising:

receiving the data frame transmitted over the communication channel, the data frame including a calibration pulse and one or more nibble pulses;

receiving a high frequency (HF) clock signal;

generating a receiver clock using the HF clock signal by counting cycles of the HF clock signal, wherein a period of the receiver clock equals a predetermined prescaler value of the HF clock signal cycles;

generating a rollover signal when the HF clock signal cycle count reaches the predetermined prescaler value;

counting the generated rollover signals;

measuring a length of the calibration pulse in terms of the rollover signal count and the HF clock signal cycle count;

comparing the measured calibration pulse length with an ideal calibration pulse length to determine a variation between the transmitter and receiver clocks, wherein said variation is expressed as a number of HF clock signal cycles;

distributing said variation over the ideal calibration pulse length to determine the number of HF clock cycles per transmitter clock cycle in the ideal calibration pulse length;

adjusting the predetermined prescaler value by the determined number of HF clock signal cycles per transmitter clock cycle to obtain the adjusted prescaler value by, adding the determined number of HF clock signal cycles to the receiver clock if the ideal calibration pulse length is greater than the measured calibration pulse length; and subtracting the determined number of HF clock signal cycles from the receiver clock if the measured calibration pulse length is greater than the ideal calibration pulse length;

generating an adjusted receiver clock by counting cycles of the HF clock signal and adjusting a period of the adjusted receiver clock by, removing one HF clock signal cycle from the adjusted prescaler value if the measured calibration pulse length is greater than the ideal calibration pulse length; and removing two HF clock signal cycles from the adjusted prescaler value if the ideal calibration pulse length is greater than the measured calibration pulse length;

measuring a nibble pulse length using the adjusted receiver clock; and increasing the nibble pulse length by one receiver clock cycle if the number of HF clock signal cycles for a portion of the nibble pulse length not measured by the adjusted receiver clock lies within an allowable range, wherein the allowable range is ⅛ of one adjusted receiver clock period.

* * * * *